United States Patent
Bensaih et al.

(10) Patent No.: US 12,463,507 B2
(45) Date of Patent: Nov. 4, 2025

(54) STATOR ASSEMBLY FOR ELECTRONICALLY SWITCHED ELECTRIC MOTOR

(71) Applicant: VALEO SYSTEMES THERMIQUES, La Verriere (FR)

(72) Inventors: Elmehdi Bensaih, La Verriere (FR); Guillaume Robelet, La Verriere (FR); Maurad Berkouk, La Verriere (FR)

(73) Assignee: VALEO SYSTEMES THERMIQUES, La Verriere (FR)

( * ) Notice: Subject to any disclaimer, the term of this patent is extended or adjusted under 35 U.S.C. 154(b) by 224 days.

(21) Appl. No.: 18/001,012

(22) PCT Filed: Jun. 3, 2021

(86) PCT No.: PCT/EP2021/064915
§ 371 (c)(1),
(2) Date: Dec. 7, 2022

(87) PCT Pub. No.: WO2021/249864
PCT Pub. Date: Dec. 16, 2021

(65) Prior Publication Data
US 2023/0216380 A1    Jul. 6, 2023

(30) Foreign Application Priority Data
Jun. 10, 2020    (FR) ..................... 2006086

(51) Int. Cl.
*H02K 11/01* (2016.01)
*B60H 1/00* (2006.01)
(Continued)

(52) U.S. Cl.
CPC ....... *H02K 11/014* (2020.08); *B60H 1/00464* (2013.01); *H02K 5/15* (2013.01); *H02K 21/22* (2013.01)

(58) Field of Classification Search
CPC .. H02K 1/16; H02K 3/32; H02K 3/38; H02K 11/01; H02K 11/014; H02K 11/02; H02K 11/40
(Continued)

(56) References Cited

U.S. PATENT DOCUMENTS

| 10,608,507 B2 | 3/2020 | Guigou et al. |
| 2017/0033646 A1* | 2/2017 | Capoulun ............... H02K 5/10 |

(Continued)

FOREIGN PATENT DOCUMENTS

| EP | 3125413 A1 | 2/2017 |
| JP | 2013188091 A | 9/2013 |

OTHER PUBLICATIONS

European Patent Office, International Search Report (with English translation) and Written Opinion of corresponding International Application No. PCT/EP2021/064915, dated Aug. 6, 2021.

*Primary Examiner* — Oluseye Iwarere
*Assistant Examiner* — Minki Chang
(74) *Attorney, Agent, or Firm* — Osha Bergman Watanabe & Burton LLP (57) ABSTRACT

Stator assembly for an electronically switched electric motor, the stator assembly having a stator extending in the direction of a first axis, the stator including a winding support around which at least one winding is wound, the winding support having a radially inner surface defining a central hole extending in the direction of the first axis; a screen at least partly covering the at least one winding of the stator, the screen having at least one tab in contact with the radially inner surface of the winding support.

9 Claims, 8 Drawing Sheets

(51) Int. Cl.
*H02K 5/15* (2006.01)
*H02K 21/22* (2006.01)

(58) Field of Classification Search
USPC .................................................. 310/216.108
See application file for complete search history.

(56) References Cited

U.S. PATENT DOCUMENTS

| | | | |
|---|---|---|---|
| 2018/0083517 A1 | 3/2018 | Li et al. | |
| 2018/0159390 A1* | 6/2018 | Guigou | H02K 1/187 |
| 2018/0166952 A1* | 6/2018 | Guigou | H02K 5/1732 |
| 2018/0298908 A1* | 10/2018 | Capoulun | H02K 11/0141 |
| 2020/0119616 A1* | 4/2020 | Ludwig | H02K 11/014 |

* cited by examiner

STATOR ASSEMBLY FOR ELECTRONICALLY SWITCHED ELECTRIC MOTOR

TECHNICAL FIELD

The present description relates to a stator assembly for an electronically switched electric motor and to a method for manufacturing such a stator assembly. The present description also relates to an electronically switched electric motor comprising such a stator assembly, to a ventilation device comprising such a motor and to a heating, ventilation and/or air conditioning installation, in particular of a motor vehicle, comprising such a ventilation device.

BACKGROUND OF THE INVENTION

Motor vehicles are commonly equipped with a heating, ventilation and/or air conditioning installation comprising a ventilation device for generating an airflow. Such an installation generally comprises a ventilation duct, through which the airflow circulates. The airflow is generated by a propeller or fan wheel set into rotation by an electric motor.

The electric motor is particularly an electronically switched motor, or a brushless DC motor. The electric motor comprises a rotor and a stator, each supporting electromagnetic elements.

The stator generally comprises a plurality of windings supported by an insulator for a pack of laminations. When electric currents circulate through the windings, magnetic fields are produced. The rotor is provided with a plurality of permanent magnets also producing magnetic fields. The interaction of the magnetic fields produced by the stator windings with the magnetic fields produced by the rotor magnets generates the movement of the rotor relative to the stator, and subsequently the rotation of the fan wheel.

A known problem with this type of motor is that, when the motor is used, the electromagnetic radiation that is produced can disrupt the use of other electronic devices located in the vicinity.

It is known, from document FR-B1-3036889, for a screen made of electrically conductive material, electrically connected to ground, to be disposed between the stator and the rotor, in order to limit the propagation of electromagnetic radiation outside the electric motor, in the direction of the axis of rotation of the motor.

The screen is conventionally fixed onto the stator by means of screws, parallel to the axis of the motor. To this end, the screen generally comprises fixing lugs bearing against a face of the stator that is oriented perpendicular to the axis of the motor. Each fixing lug comprises a hole intended to be aligned with a respective hole in the stator. A screw is screwed into the holes once they are aligned.

When manufacturing such an electric motor, in particular on an assembly line, it is common practice for the screen to be disposed on the stator on a first workstation, so that each hole through one of the fixing lugs is aligned with one of the holes in the stator. The stator and the screen are then moved together to a second workstation, where the operation of screwing the screen onto the stator is performed.

However, the accelerations experienced when moving the stator and the screen between the first workstation and the second workstation can move the screen relative to the stator, such that the holes through the fixing lugs of the screen are no longer aligned with the holes through the stator. The screen then can no longer be screwed onto the stator, on the second workstation, which disrupts the assembly operations.

The present description aims to propose a solution for facilitating mounting an electric motor.

The present disclosure improves the situation.

SUMMARY OF THE INVENTION

A stator assembly is proposed for an electronically switched electric motor, the stator assembly comprising:
  a stator extending in the direction of a first axis, the stator comprising a winding support, around which at least one winding is wound, the winding support having a radially inner surface defining a central hole extending in the direction of the first axis; —a screen at least partly covering the at least one winding of the stator, the screen comprising at least one tab in contact with the radially inner surface of the winding support.

Thus, advantageously, the screen is held relative to the stator by the contact between the tabs of the screen and the radially inner surface of the winding support. Thus, any movement of the screen relative to the stator is limited, or even prevented, when moving the stator and the screen, after the screen has been placed on the stator and before the operation of screwing the screen onto the stator.

According to some advantageous aspects, the stator assembly for an electronically switched electric motor can comprise one or more of the following features, taken individually or according to all the possible technical combinations:

the winding support comprises a pack of laminations at least partly covered by an insulator, with each tab preferably being in contact with part of the radially inner surface defined by the pack of laminations;
  the pack of laminations comprises at least one lug radially projecting inwardly into the central hole, with each tab of the screen being in contact, in particular in an orthoradial direction, with one of the lugs of the pack of laminations, the pack of laminations preferably comprising three lugs, the lugs more preferably being angularly evenly distributed around the first axis;
  each lug is formed by a sub-assembly of laminations of the pack of laminations, preferably by a sub-assembly of adjacent laminations of the pack of laminations, with each lug more preferably being formed by a sub-assembly of four laminations of the pack of laminations;
  the sub-assembly has fewer laminations than the laminations of the pack of laminations;
  the number of laminations in the pack of laminations ranges between 12 and 50 laminations;
  each lug is formed by the same sub-assembly of laminations, with the sub-assembly of laminations preferably forming one end of the pack of laminations in the direction of the first axis;
  the screen comprises a pair of tabs associated with each lug of the pack of laminations, with a tab of each pair of tabs being positioned on either side of the associated lug;
  the screen comprises a cylindrical part having the first axis as its axis, the cylindrical part defining a central opening of the screen, with each tab radially extending inside the cylindrical part;
  the screen comprises at least one fixing lug radially extending from the cylindrical part, with each fixing lug bearing on a face of the pack of laminations extending in a plane normal to the direction of the first axis, the screen preferably comprising three fixing lugs, the lugs more preferably being evenly angularly distributed around the first axis;

the screen comprises an annular part radially extending inwardly from the cylindrical part, with each tab of the screen extending from the annular part;

the annular part extends, in an orthoradial direction, between the fixing lugs;

the screen is fixed to the winding support by means of screws, with each screw preferably being received through one of the fixing lugs, on the one hand, and the pack of laminations, if necessary, on the other hand;

the insulator comprises at least one shell, preferably made of plastic, with each shell forming housings for receiving laminations of the pack of laminations, each shell more preferably being positioned facing a face of the pack of laminations in the direction of the first axis;

the thickness of the screen ranges between 0.35 mm and 1 mm, preferably between 0.35 mm and 0.45 mm;

the screen is formed by deforming a metal strip, for example, by stamping;

the winding support comprises a plurality of branches radially extending around the first axis, with each branch comprising a winding coil;

the screen comprises first holes, with each first hole being opposite, in the direction of the first axis, a space between two adjacent branches of the winding support;

the screen comprises indentations, preferably angularly evenly distributed around the first axis;

each indentation is opposite, in the direction of the first axis, a branch of the winding support;

the screen comprises second holes, with each second hole of the screen receiving a first projection formed by the winding support, the first projection extending, in the direction of the first axis, in the vicinity of a radial end of a winding coil, the first projection preferably being formed by the insulator, if necessary;

the screen comprises a first frustoconical part radially extending outside the cylindrical part;

the screen comprises a second frustoconical part radially extending outside the first frustoconical part, the second frustoconical part being tapered more than the taper of the first frustoconical part;

each second hole being in the first frustoconical part and/or the second frustoconical part of the screen;

the second frustoconical part forms a bulge radially outside each second hole.

According to another aspect, an electronically switched electric motor is described, the electric motor comprising a stator assembly as described above and a stator support, the stator being mounted on the stator support.

According to some advantageous aspects, the electronically switched electric motor can comprise one or more of the following features, taken individually or according to any technically possible combination:

the stator support comprises a barrel with the first axis as its axis, with the winding support of the stator being mounted on the barrel of the stator support;

the barrel has housings for receiving screws, adapted to be disposed opposite holes in the fixing lugs, on the one hand, and the pack of laminations, if necessary, on the other hand, with one end of each screw being engaged in a respective reception housing;

the barrel of the stator support comprises grooves, with each groove receiving a second projection formed by the pack of laminations, with each second projection corresponding to a housing of a screw.

According to another aspect, a ventilation device is described, in particular for a heating, ventilation and/or air conditioning installation, in particular for a motor vehicle, comprising a fan wheel and an electric motor as described above, with the fan wheel being fixed to the motor in order to be set into rotation.

According to another aspect, a heating, ventilation and/or air conditioning installation is described, in particular for a motor vehicle, comprising a ventilation device as described above and a ventilation duct, in which the ventilation wheel is housed.

According to another aspect, a method for manufacturing a stator assembly as described above is described, the method comprising the following steps:

i. providing a stator, the stator comprising a winding support, around which at least one winding is wound, the winding support having a radially inner surface defining a central hole extending in the direction of the first axis;

ii. providing a screen comprising at least one tab extending in a direction having at least one component in a radial direction relative to the first axis;

iii. positioning the screen opposite the stator in the direction of the first axis, such that the screen at least partly covers the at least one winding of the stator, each tab of the screen extending, in the vicinity of the central hole of the winding support, radially inwardly relative to the first axis;

iv. deforming each tab, preferably by stamping, in order to be in contact with the radially inner surface of the winding support.

According to some advantageous aspects, the manufacturing method can comprise one or more of the following features, taken individually or according to any technically possible combination:

step iv involves deforming each tab by applying a stress oriented in the direction of the first axis;

in step iii, the screen is positioned angularly relative to the stator such that each tab partly extends opposite a lug of the associated pack of laminations, in the direction of the first axis, with each tab preferably projecting in an orthoradial direction, relative to the associated lug;

in step iii, each tab extends opposite a lug of the associated stator, in the direction of the first axis, over a length, measured in the orthoradial direction, of at least 3 mm;

the method further comprises a step v involving screwing each of the fixing lugs onto the winding support.

BRIEF DESCRIPTION OF DRAWINGS

Further features, details and advantages will become apparent on reading the following detailed description, and on studying the appended drawings, in which.

DETAILED DESCRIPTION OF THE INVENTION

Figure 1:
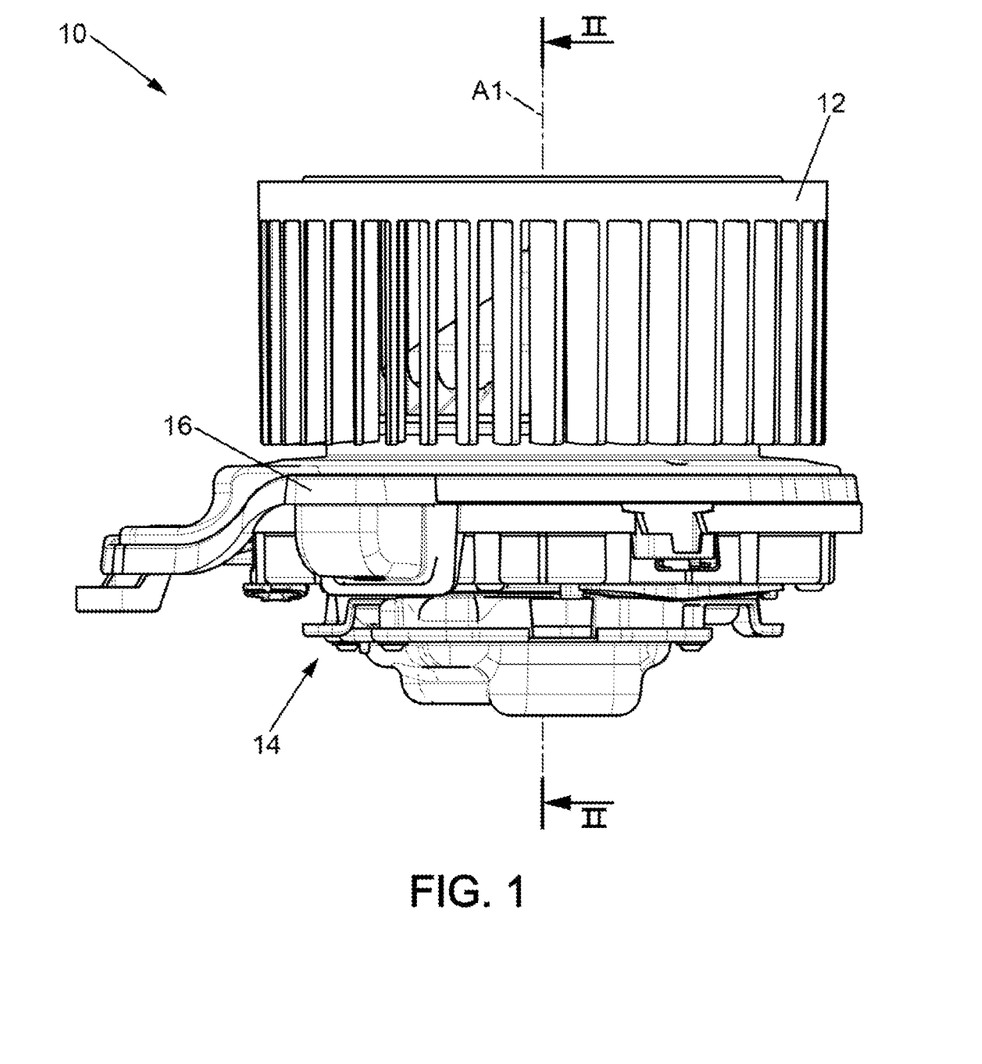
FIG. 1 schematically shows a ventilation device for a heating, ventilation and/or air conditioning installation of a motor vehicle.

FIG. 1 schematically shows a ventilation device 10 (or fan) for a heating, ventilation and/or air conditioning installation for a motor vehicle.

The ventilation device 10 basically comprises, as shown, a fan wheel 12, an electric motor 14, and an electric motor support 16. The fan wheel 12 rotates about a first axis A1. The electric motor 14 is intended to set the fan wheel 12 into rotation about the first axis A1. The electric motor support 16 is intended to allow the ventilation device 10 to be fixed in a motor vehicle, while limiting the transfer of any vibrations generated by the electric motor 14 and/or the fan wheel 12 in the motor vehicle and/or any external stresses toward the electric motor 14 and/or the fan wheel 12.

The electric motor support 16 can particularly comprise two coaxial, rigid rings, with the first axis A1 as its axis, connected together by a decoupling element made of flexible elastomer material. The decoupling element between the inner ring and the outer ring can also assume the form of a ring. The inner ring can be intended to be fixed to the motor. The outer ring can be intended to be fixed to a structural element of a vehicle ventilation system. The elastomer material is polystyrene-b-poly (ethylene-butylene)-b-polystyrene or SEBS, for example.

Figure 2:
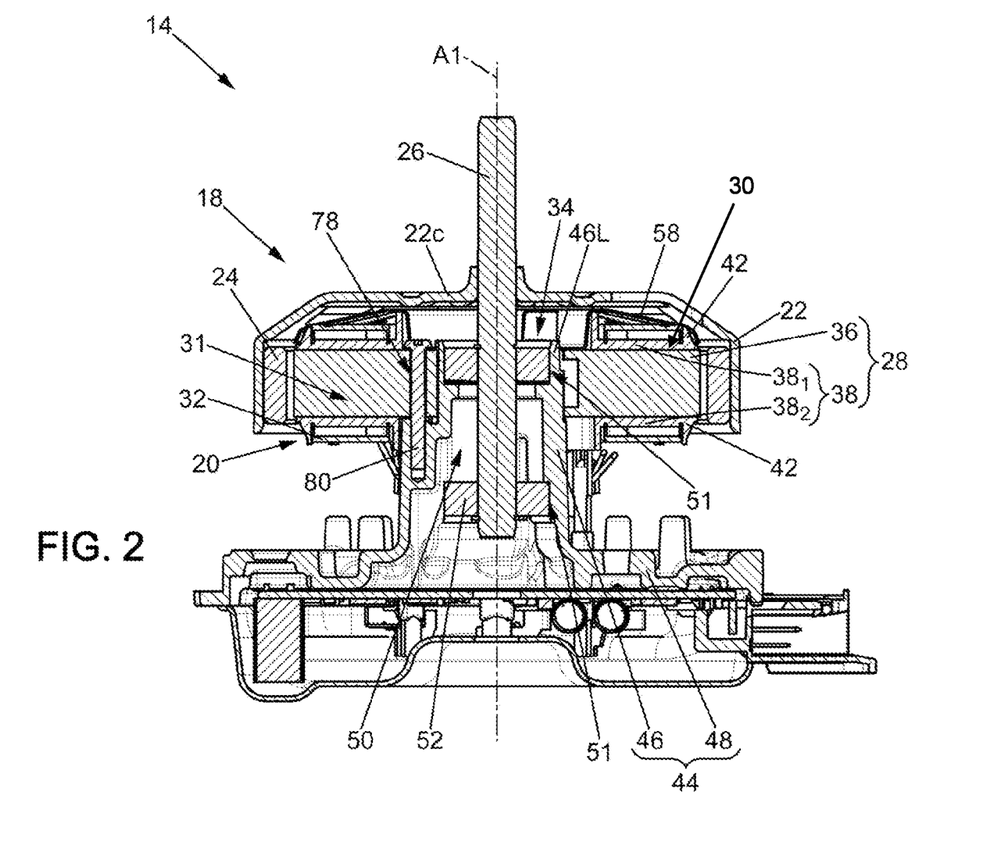
FIG. 2 is a view, along the cutting plane II-II, of the electric motor of the ventilation device of FIG. 1.

As shown in FIG. 2, the electric motor 14 basically comprises a rotor 18 and an associated stator 20. In this case, this is an external rotor 18 in that it is associated with a stator 20 radially disposed inside the rotor 18. The rotor 18 comprises a cup 22 rotationally symmetrical about the first axis A1, in the shape of a bell. The rotor 18 also comprises magnets 24 in this case fixed to an inner face of the cup 22, in particular on a cylindrical strip of the inner face of the cup 22. The cup 22 of the rotor 18 is fixed, at the center thereof, to a first shaft 26 with the first axis A1 as its axis. The first shaft 26 forms the output (or rotation) shaft of the electric motor 14, driving the fan wheel 12. To this end, the fan wheel 12 in this case is directly fixed on the first shaft 26.

Figure 3:
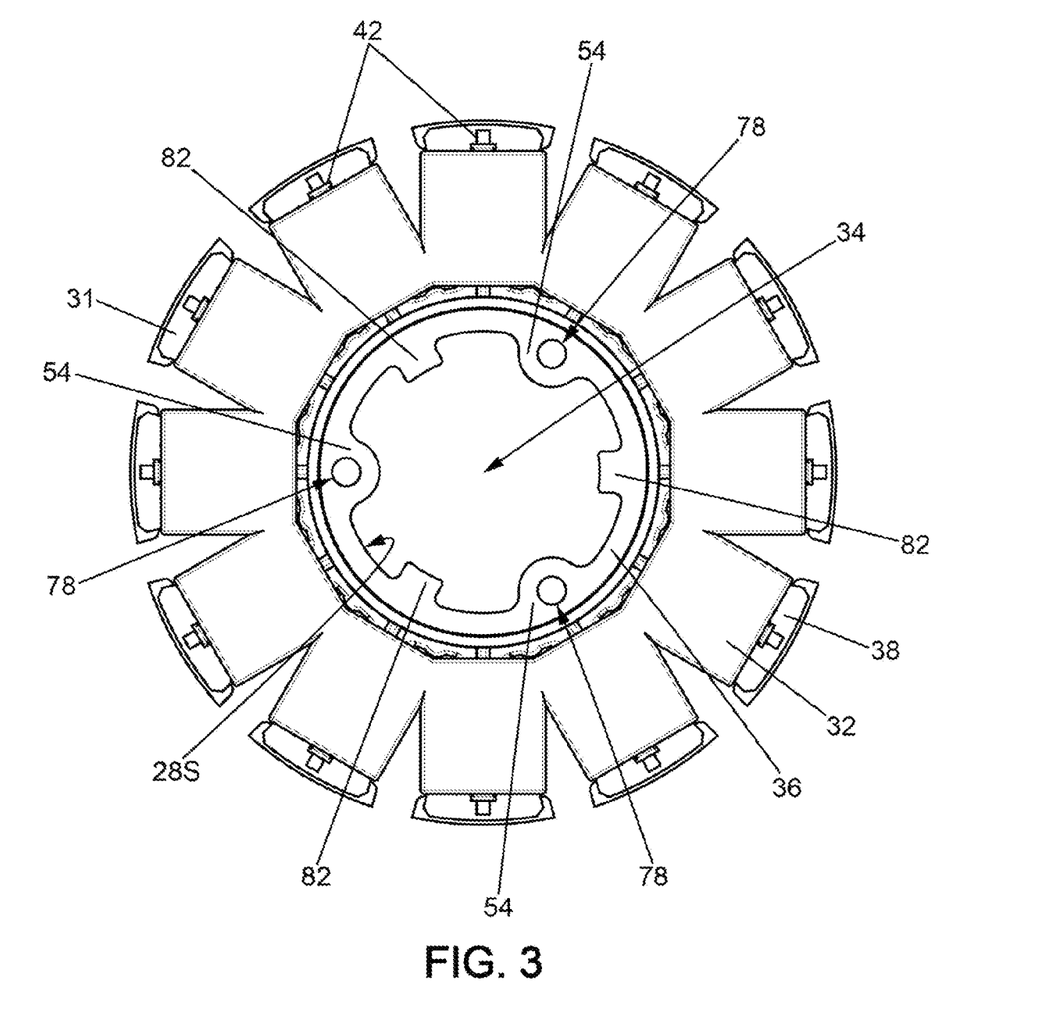
FIG. 3 schematically shows a top view of the stator of the electric motor of FIG. 2.

The stator 20, shown in FIG. 3, in this case is rotationally symmetrical about the first axis A1. The stator 20 thus has a generally cylindrical shape with the first axis A1 as its axis.

The stator 20 comprises a winding support 28, around which at least one winding 30 is wound. In this case, three windings 30 are wound around the winding support 28. Each winding 30 corresponds to a phase of the motor 14.

The winding support 28 comprises a plurality of branches 31 radially extending relative to the first axis A1. The winding support 28 thus is generally star-shaped. Each branch 31 supports a respective coil 32 of one of the windings 30. Thus, the number of branches 31 advantageously is a multiple of the number of windings 30. In this case, there are twelve branches 31. Each winding 30 thus comprises four winding coils 32, with each coil 32 being located around a respective branch 31 of the winding support 28.

The winding support 28 comprises, in this case is formed by, a pack of laminations 36 at least partly covered by an insulator 38. The insulator 38 in this case comprises two shells 381, 382, each positioned opposite a face of the pack of laminations 36 in the direction of the first axis A1. Each shell 381, 382 forms housings for receiving laminations of the pack of laminations 36. Each shell 381, 382 can be made of plastic. Each shell 381, 382 of the insulator 38 can be overmolded onto the pack of laminations 36. The pack of laminations 36 comprises a stack of metal laminations.

Each shell 381, 382 of the insulator 38 comprises, in the vicinity of a radially external end, a first projection 42 mainly extending in the direction of the first axis A1. Each first projection 42 thus forms a radial stop for the corresponding winding coil 32. Thus, at each radially outer end of a branch 31 of the winding support 28, two first projections 42, aligned in the direction of the first axis A1, form stops for the winding coil 32, extending around the branch 31.

Furthermore, the winding support 28 has a radially inner surface 28S defining a central hole 34 with the first axis A1 as its axis.

As shown in FIG. 3, the pack of laminations 36 comprises second projections 54 radially extending inwardly. In the example shown, the pack of laminations 36 forms three second projections 54. The second projections 54 in this case are evenly angularly distributed around the first axis A1.

Figure 5:
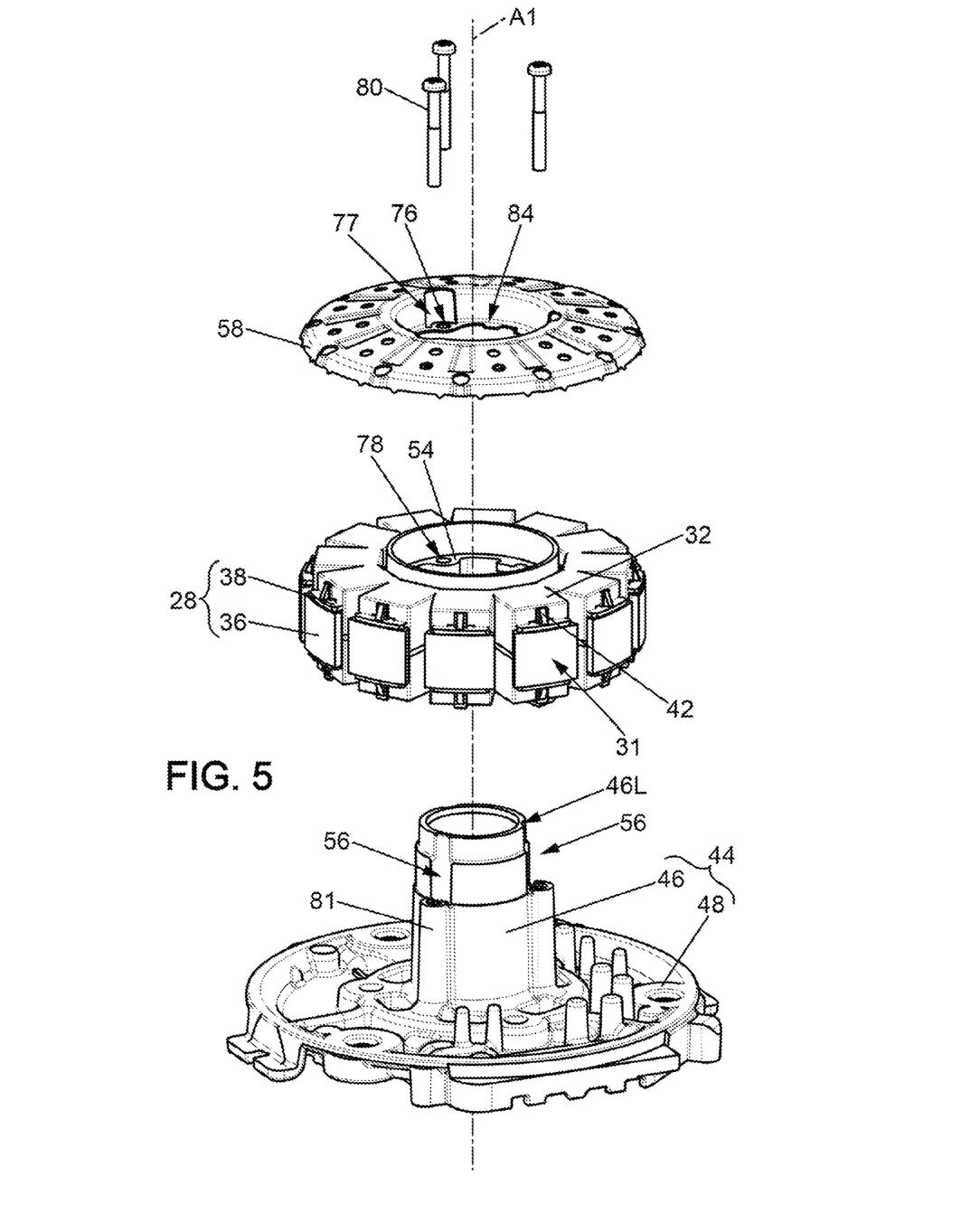
FIG. 5 is an exploded view of the stator assembly of FIG. 4, in a transient assembly configuration, and of a stator support.

With reference to FIG. 5, each second projection 54 of the pack of laminations 36 comprises a housing 78 intended to receive a screw 80. In this case, each housing 78 is oriented along the first axis A1. Each housing 78 completely passes through the respective second projection 54, see the pack of laminations 36, in the direction of the first axis A1.

As shown in FIG. 3, the pack of laminations 36 of the stator 20 further comprises a plurality of lugs 82 radially projecting inwardly. The pack of laminations 36 in this case comprises three lugs 82. The lugs 82 in this case are evenly angularly distributed around the first axis A1.

Each lug 82 is formed by a sub-assembly of laminations of the pack of laminations 36. The sub-assembly of laminations has fewer laminations than the laminations of the pack of laminations 36. The sub-assembly can comprise between two and six laminations, for example, in particular four laminations of the pack of laminations 36. The pack of laminations 36 can particularly comprise between 12 and 50 laminations, in particular 24 laminations. The laminations of the sub-assembly can be adjacent, i.e., in contact in pairs. The sub-assembly of laminations preferably forms one end of the pack of laminations 36, in the direction of the first axis A1.

The pack of laminations 36 can comprise two sets of lugs 82, with one set of lugs 82 being in the vicinity of each of the ends of the pack of laminations 36, in the direction of the first axis A1.

The electric motor 14 also comprises a stator support 44. The stator support 44 comprises a barrel 46 mainly extending in the direction of the first axis A1. In this case, the barrel 46 is generally cylindrical, with the first axis A1 as its axis. The free end 46L of the barrel 46 is radially disposed inside the cup 22 of the rotor 18.

The stator support 44 also comprises a plate 48. The plate 48 in this case substantially extends in a plane perpendicular to the first axis A1, from the base of the barrel 46. The plate 48 is arranged opposite the stator 20, in the direction of the first axis A1. In the example shown, the plate 48 assumes a generally annular shape, with the first axis A1 as its axis.

The stator support 44 is one piece in that there is a continuity of material between the plate 48 and the barrel 46. The stator support 44 is produced by molding, for example, in particular by injection molding.

The stator support 44 defines an internal channel 50. The internal channel 50 completely passes through the barrel 46 and the plate 48 in the direction of the first axis A1. The inner channel 50 can be generally cylindrical. In this case, two housings 51 are formed in the internal channel 50 of the stator support 44. Each housing 51 receives a bearing ring 52, in particular a ball bearing. The first shaft 26 is partly received in the internal channel 50 of the stator support 44, free to rotate about the first axis A1 relative to the stator support 44, via the bearing rings 52.

The winding support 28 is fixed onto the barrel 46 of the stator support 44. To this end, the barrel 46 of the stator support 44 comprises grooves 56, particularly shown in FIG. 5, on its radially external surface. The grooves 56 extend in the direction of the first axis A1. Each groove 56 is shaped on the barrel 46 in order to at least partly receive a second projection 54 of the pack of laminations 36. Thus, the relative rotations are limited about the first axis A1, of the pack of laminations 36, and thus of the stator 20, relative to the barrel 46, and therefore the stator support 44.

The barrel 46 of the stator support 44 also has housings 81 for receiving a screw. The reception housings 81 are evenly angularly distributed around the first axis A1.

Figure 4:
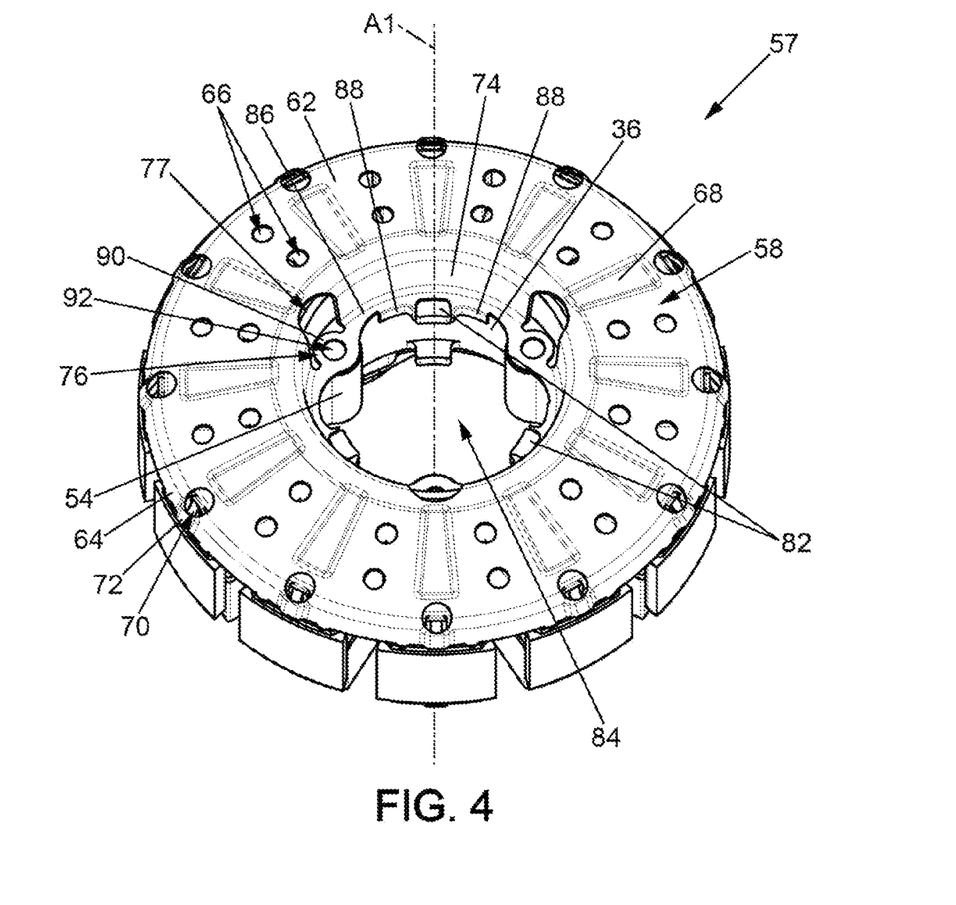
FIG. 4 schematically shows a perspective view of a stator assembly comprising a stator and a screen that can be implemented in the electric motor of FIG. 2, in a transient assembly configuration.

Finally, the electric motor 14 comprises a screen 58, more specifically shown in FIGS. 4 and 5. FIG. 4 shows a stator assembly 57 comprising the stator 20 and the screen 58 in a transient assembly configuration. The screen 58 in this case extends along the first axis A1. "Extending along the first axis A1" is understood herein to mean that the screen 58 is generally annular shaped, with the axis A1 as its axis. Thus, the height of the screen 58 is in the direction of the first axis A1.

In particular, in this case, the screen 58 is rotationally symmetrical about the axis A1. The rotational symmetry of the screen 58, about the first axis A1, is of the order, for example, that ranges between three and sixteen. Such a configuration of the screen 58, rotationally symmetrical about the first axis A1, is well adapted to a stator 20 and to a rotor 18, rotationally symmetrical about the first axis A1. Thus, a constant mechanical and electromagnetic configuration of the motor 14 is obtained.

The screen 58 in this case is disposed between the stator 20 and the rotor 18. More specifically, the screen 58 is disposed between the rotor 18 and the stator 20 in the direction of the first axis A1. Thus, the screen 58 is particularly disposed between the winding support 28 and a bottom 22c of the cup 22 of the rotor. In particular, the screen 58 of generally annular shape covers all or part, in a plane normal to the first axis A1, of the windings 30 of the stator 20. The screen 58 thus limits, or even prevents, the propagation of electromagnetic radiation outside the electric motor 14, in the direction of the first axis A1.

The screen 58 can be formed by a metal lamination. The thickness of the metal lamination can particularly range between 0.35 mm and 1 mm, preferably between 0.35 mm and 0.45 mm. The screen 58 can be formed by deforming a metal lamination, in particular by stamping and perforations, if necessary.

The screen 58 in this case has a first frustoconical part 62 with the first axis A1 as its axis. The outer diameter of the first frustoconical part 62 is greater than the distance, measured in a radial direction, from the radially outer ends of the coils 32 of the windings 30 to the first axis A1. Thus, the first frustoconical part 62 partly covers the coils 31 of the windings 30 of the stator 20, in the direction of the first axis A1.

On the first frustoconical part 62, the screen 58 comprises first holes 66. Each first hole 66 is opposite, in the direction of the first axis A1, a space between two adjacent branches 31 of the winding support 28. The screen 58 in this case comprises a pair of first holes 66. The holes 66 of a pair of first holes 66 in this case are remote in a radial direction, relative to the first axis A1. The first holes 66 allow the passage of an airflow and thus assist the cooling of the stator 20.

According to the example shown, the first frustoconical part 62 of the screen 58 also comprises indentations 68. The indentations 68 particularly allow the screen 58 to be mechanically reinforced. The indentations 68 are evenly angularly distributed around the first axis A1. Each indentation 68 in this case is opposite, in the direction of the first axis A1, a branch 31 of the winding support 28. Each indentation 68 in this case mainly extends in a radial direction, relative to the first axis A1.

The screen 58 in this case has a second frustoconical part 64 with the first axis A1 as its axis, radially extending outside the first frustoconical part 62. In this case, the second frustoconical part 64 is adjacent to the first frustoconical part 62. The taper of the second frustoconical part 64 is greater than the taper of the first frustoconical part 62. In other words, as a section view along a radial plane, the pitch of the second frustoconical part 64 is greater than the pitch of the first frustoconical part 62. In this case, the second frustoconical part 64 has an internal diameter that is greater than the distance, measured in a radial direction, from the radially outer ends of the coils 32 of the windings 30 to the first axis A1. Thus, the second frustoconical part 64 in this case partly covers the windings 30 of the stator 20 in a radial direction relative to the first axis A1. Alternatively, the second frustoconical part 64 can be replaced by a cylindrical portion, with the first axis A1 as its axis.

In the example shown, the screen 58 also comprises second holes 70. Each second hole 70 in this case is partly located in the first frustoconical part 62 and partly located in the second frustoconical part 64 of the screen 58. The screen 58 also comprises a bulge 72, radially outside each second hole 70. Each second hole 70 of the screen 58 receives a first projection 42 of the insulator 38. Thus, the screen 58 can be disposed closer to the stator 20. Thus, the spacing between the stator 20 and the screen 58 is reduced in the direction of the first axis A1, which improves the efficiency of the screen 58. This also reduces the footprint of the screen 58.

In the example shown, the screen 58 also comprises a radially internal cylindrical part 74. The cylindrical part 74 particularly radially extends inside the first frustoconical part 62. The cylindrical part 74 is adjacent to the first cylindrical part 74, for example.

The cylindrical part 74 defines a central opening 84 of the screen 58. The cylindrical part 74 is at least partly inserted into the central hole 34 of the winding support 28, in particular into a portion of the central hole 34, defined by the insulator 38.

The screen 58 is in contact, radially outside, with the winding support 28. In particular, the screen 58 in this case is in contact, radially outside, with the insulator 38 of the winding support 28. To this end, the edge radially outside the screen 58 comprises a plurality of teeth 60. The teeth 60 in this case are formed by the edge radially outside the second frustoconical part 64 of the screen 58. Each tooth 60 extends in a direction comprising a component in the direction of the first axis A1. Thus, one end of each tooth 60 is in contact with a face of the insulator 38, perpendicular to the first axis A1. In this case, each tooth 60 extends in a direction also comprising a radial component relative to the first axis A1.

Each tooth 60 in this case assumes a triangular shape, in particular an isosceles triangle shape. The tip of each tooth 60 is in contact with the insulator 38. Thus, the contact pressure of the screen 58 on the insulator 38 is high, providing a proper hold for the screen 58 on the stator 20. The dimension of each tooth 60, measured in the direction of the first axis A1, can range between 0.5 mm and 1 mm.

All the teeth 60 are identical in this case.

In the example shown, the screen 58 comprises a pair of teeth 60 associated with each branch 31 of the winding support 28. In other words, a pair of teeth 60 of the screen 58 is in contact with each branch 31 of the winding support 28. Thus, a more stable contact is provided for the screen 58 on each branch 31 of the winding support 28. The teeth 60 of each pair of teeth in this case are positioned symmetrically relative to a first plane P 1, the median of the branch 31 of the considered winding support 28, and containing the first axis A1.

Furthermore, in this case the screen 58 comprises lugs 76 for fixing to the stator 20 and/or to the stator support 44. The fixing lugs 76 in this case substantially extend along a plane normal to the first axis A1. More specifically, the fixing lugs 76 in this case extend in a radial direction, relative to the first axis A1, from the cylindrical part 74 of the screen 58. The fixing lugs 76 in this case are evenly angularly distributed around the first axis A1. In this case, there are three fixing lugs 76. The screen 58 thus has rotational symmetry about the first axis A1 of the order of three.

According to the example shown, the cylindrical part 74 of the screen 58 has an opening 77 associated with each fixing lug 76. This opening 77 is obtained by cutting the lamination forming the screen 58, in order to particularly define the fixing lugs 76, then by stamping the lamination in order to particularly form the cylindrical part 74 and moving, along the first axis A1, the fixing lugs 76 relative to the first and second frustoconical parts 62, 64 of the screen 58. Thus, due to the presence of the openings, each fixing lug 76 in this case can have an annular portion 90 surrounding a hole 92. Of course, a person skilled in the art can design another method for manufacturing the screen 58 allowing the fixing lugs 76 to have an annular portion surrounding a hole, without requiring an opening 77 in the cylindrical part 74 of the screen 58.

Finally, still shown in FIG. 4, the screen 58 also in this case comprises annular portions 86 radially extending inwardly from the cylindrical part 74, between the fixing lugs 76. The annular portions 86 extend in a plane normal to the first axis A1, in particular in the same plane normal to the first axis A1 as the fixing lugs 76.

Finally, the screen 58 comprises a plurality of tabs 88. Each tab 88 radially extends inside the cylindrical part 74 from an associated annular part 86. Each tab 88 in this case is designed so as to be deformable.

Fixing the screen 58 onto the stator 20 and, in this case, the stator support 44, then can be carried out as follows.

As shown in FIG. 4, the screen 58 is placed on the stator 20 such that each fixing lug 76 bears on a face of the pack of laminations 36, extending in a plane normal to the direction of the first axis A1. Each fixing lug 76 is then disposed opposite, in the direction of the first axis A1, one of the second projections 54 of the pack of laminations 36, and one of the reception housings 81 of the barrel 46. More specifically, the hole 92 of each fixing lug 76 is opposite a housing 78 of the pack of laminations 36 and a reception housing 81 of the barrel 46.

A tab 88 is then disposed in the immediate vicinity of a lug 82 of the pack of laminations 36. More specifically, two tabs 88 are then associated with each lug 82. Each tab 88 is disposed such that over part of its length, measured in an orthoradial direction relative to the first axis A1, the tab 88 is overlaid with the associated lug 82, in the direction of the axis A1. Thus, the orthoradial ends of each lug 82 in this case are covered by a tab 88.

Figure 6:
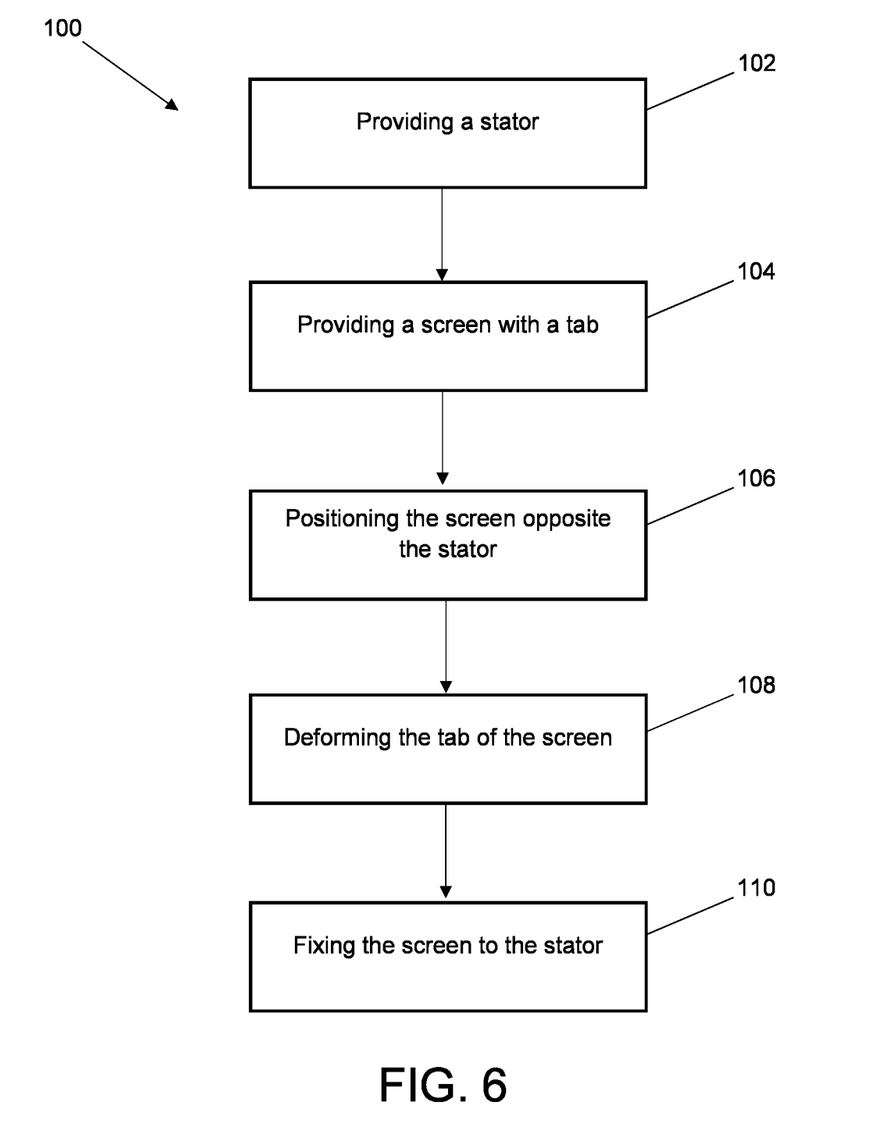
FIG. 6 shows a flow chart of an example of a method for manufacturing a stator assembly comprising a stator and a screen that can be implemented in the electric motor of FIG. 2.

The tabs 88 then can be deformed, in particular folded, in order to basically extend in the direction of the first axis A1, as shown in FIG. 6. During this deformation, each tab 88 comes into contact with a respective orthoradial end of an associated lug 82, on the one hand, and comes into contact with the radially inner surface 28S of the winding support 28, on the other hand. In this way, the tabs 88 allow the screen 58 to be at least temporarily held in position on the stator 20, in particular on the winding support 36.

The screen 58 then can be fixed to the stator 20, in particular to the winding support 28, and to the stator support 44, by means of screws 80. Each screw 80 is received in a housing 78 of the pack of laminations 36 and in a reception housing 81 of the barrel 46. Each screw 80 is engaged in the respective reception housing 81. Each screw 80 also can be engaged in the housing 78 of the respective pack of laminations 36.

FIG. 6 shows a flow chart of a method 100 for manufacturing a stator assembly 57 comprising a stator 20 and a screen 58, as described above.

According to this method 100, a first step 102 involves providing a stator 20 as described above. The stator 20 can be associated with a stator support 44. In particular, the stator 20 can be placed on the barrel 46 of the stator support 44, with the cooperation between the grooves 55 and the fixing lugs 76 limiting the possible relative movements of the stator 20 relative to the stator support 44.

Figure 7:
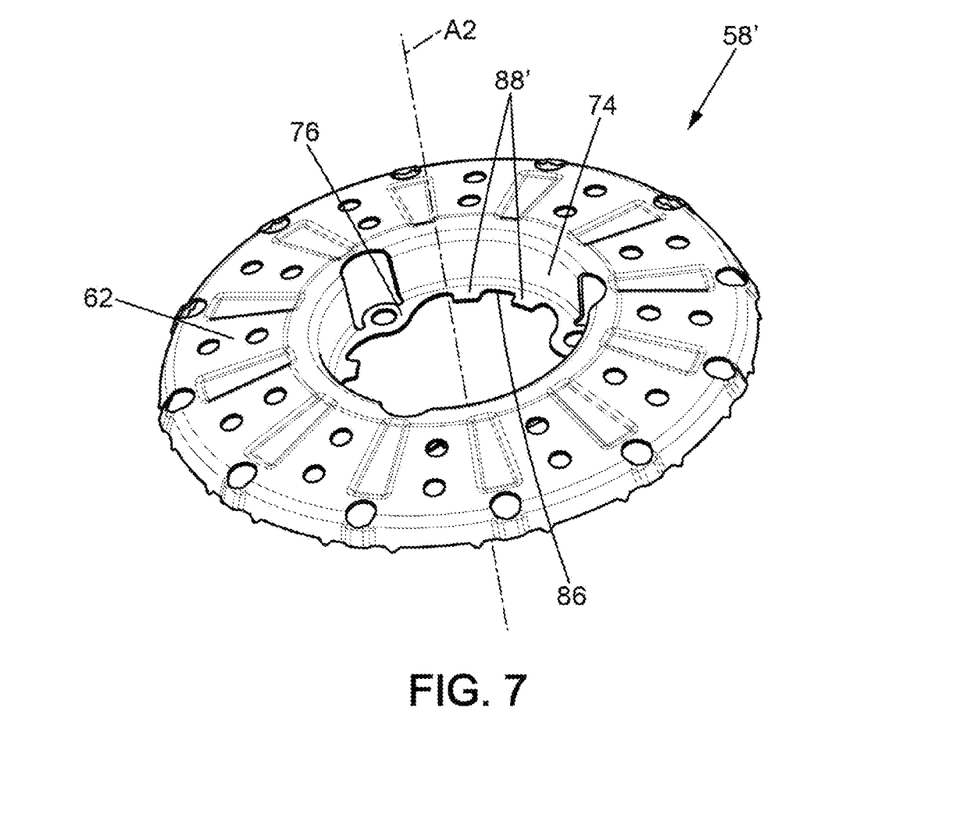
FIG. 7 schematically shows a first step of the method of FIG. 6.

The method 100 comprises a second step 104 involving providing a screen 58', as shown in FIG. 7. This differs from the screen 58 as described above with reference to FIG. 4, in that each tab 88' in this case extends in a radial direction relative to a second axis A2 of revolution of the screen 58'. In other words, each tab 88' extends perpendicular to the second axis A2. In particular, each tab 88' extends in a plane perpendicular to the second axis A2.

Figure 8:
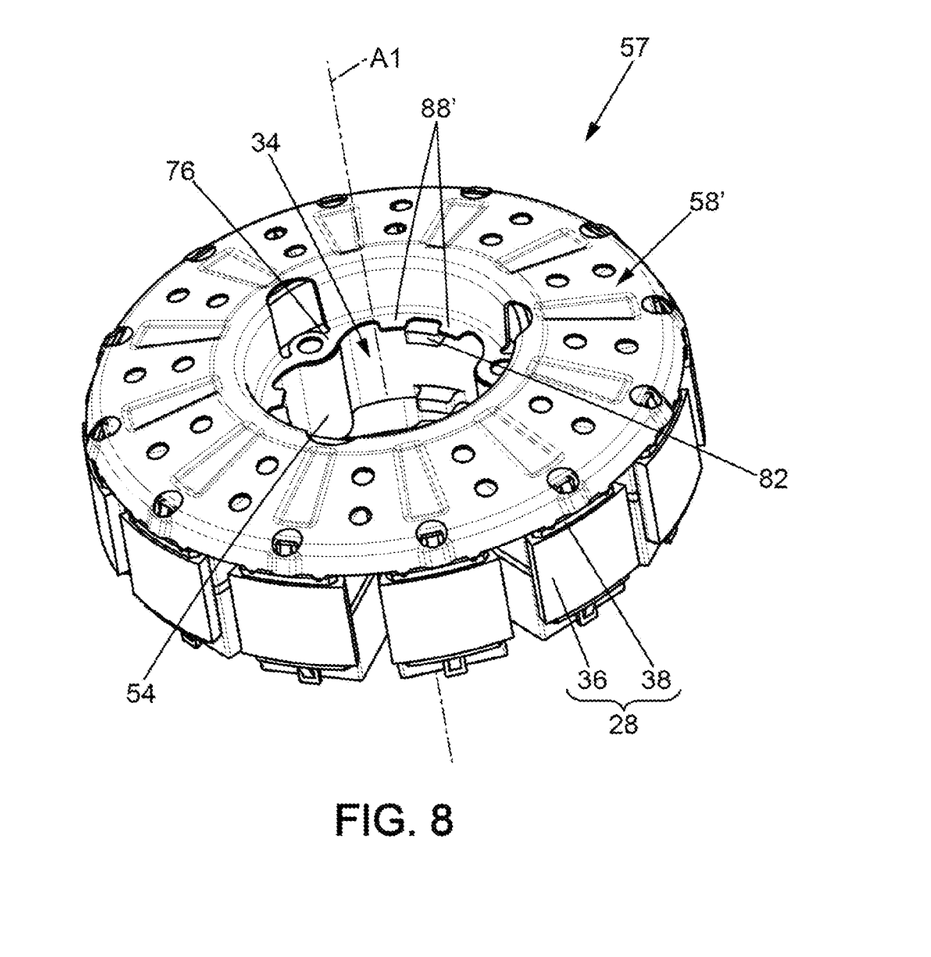
FIG. 8 schematically shows a second step of the method of FIG. 6.

A third step 106, shown in FIG. 8, then involves positioning the screen 58' opposite the stator 20 in the direction of the first axis A1, so that the screen 58' at least partly covers the windings 30 of the stator 20. The screen 58' is positioned so that the second axis A2 of revolution of the screen 58' coincides with the first axis A1 of the stator 20. Each tab 88' of the screen 58' then extends inside the central hole 34 of the winding support 28. Each tab 58' radially extends inwardly, relative to the first axis A1.

The screen 58' is angularly positioned relative to the stator 20 such that the hole 92 in each fixing lug 76 is disposed opposite, in the direction of the first axis A1, a housing 78 formed in one of the second projections 54 of the pack of laminations 36.

In such a position of the screen 58', each tab 88' partly extends over an associated lug 82 of the pack of laminations 36, in the direction of the first axis A1, projecting in an orthoradial direction, relative to the associated lug 82. Each tab 88' can extend opposite an associated lug 82 of the stator 20, in the direction of the first axis A1, over a length, measured in the orthoradial direction, of at least 3 mm.

The method 100 comprises a fourth step 108, in which each tab 88' is deformed in order to be in contact with the radially inner surface of the winding support 28. To this end, each tab 88' is deformed by applying a stress oriented in the direction of the first axis A1.

In the deformed configuration, the tabs 88 mainly extend in the direction of the first axis A1. Thus, the screen 58 is held in place relative to the stator 20 by the contact between the tabs 88 of the screen 58 and the radially inner surface 28S of the winding support 28. The movement of the screen 58 relative to the stator 20 is limited, or even prevented, when moving the stator assembly 57 comprising the stator 20 and the screen 58.

Holding the screen 58 in place in this case is improved because each lug 82 is in contact, at each of its orthoradial ends, with a deformed tab 88. Thus, a relative rotation of the screen 58 relative to the winding support 28 is limited, or even prevented.

A fifth step 110 involves fixing the screen 58 to the stator 20 by means of screws 80. Each of the fixing lugs 76 of the screen 58 is then screwed onto the winding support 28. To this end, each screw 80 is inserted through, on the one hand, the hole 92 of one of the fixing tabs 76 of the screen 58, and, on the other hand, through the associated housing 78 of the pack of laminations 36.

Each screw 80 is then screwed in order to be engaged in the reception housing 81 of the stator support 44 opposite, in the direction of the first axis A1, one of the fixing lugs 76 of the screen and of the associated housing 78 of the pack of laminations 36.

The stator assembly 57 can be moved to another workstation in order to carry out this screwing step. During this movement, the cooperation of the deformed tabs 88 and of the lugs 52 limits or even prevents a relative movement of the screen 58 relative to the stator 20. Therefore, the position of the screen 58 is always correct, which allows the screwing operation to always be carried out.

The invention is not limited to the single example described above and can have many alternative embodiments.

In particular, according to an alternative embodiment that is not shown, a screen 58 can be disposed, alternatively or in addition, between the stator 20 and the plate 48 of the stator support 44, in the direction of the axis.

The invention claimed is:

1. A stator assembly for an electronically switched electric motor, the stator assembly comprising:
   a stator extending in the direction of a first axis, the stator including a winding support, around which at least one winding is wound, the winding support having a radially inner surface defining a central hole extending in the direction of the first axis;
   a screen at least partly covering the at least one winding of the stator, the screen including a first tab in contact with the radially inner surface of the winding support,
   wherein the winding support includes a pack of laminations at least partly covered by an insulator, with the first tab being in contact with part of a radially inner surface defined by the pack of laminations,
   wherein the pack of laminations includes at least one lug radially projecting inwardly into the central hole, with each the first tab of the screen being in contact, in an orthoradial direction, with the at least one lug of the pack of laminations.

2. The stator assembly as claimed in claim 1, wherein the at least one lug is formed by a sub-assembly of laminations of the pack of laminations.

3. The stator assembly as claimed in claim 1, wherein the screen includes a pair of tabs, formed by the first tab and a second tab, associated with the at least one lug of the pack of laminations, with a tab of the pair of tabs being positioned on either side of the associated lug at least one lug.

4. The stator assembly as claimed in claim 3, wherein the screen includes a cylindrical part having the first axis as its axis, the cylindrical part defining a central opening of the screen, with each tab of the pair of tabs radially extending inside the cylindrical part.

5. The stator assembly as claimed in claim 4, wherein the screen includes an annular part radially extending inwardly from the cylindrical part, with each tab of the pair of tabs of the screen extending from the annular part.

6. An electronically switched electric motor comprising:
   a stator assembly including:
      a stator extending in the direction of a first axis, the stator including a winding support, around which at least one winding is wound, the winding support having a radially inner surface defining a central hole extending in the direction of the first axis;
      a screen at least partly covering the at least one winding of the stator, the screen including a first tab in contact with the radially inner surface of the winding support,
      wherein the winding support includes a pack of laminations at least partly covered by an insulator, with the first tab being in contact with part of a radially inner surface defined by the pack of laminations, and
      wherein the pack of laminations includes at least one lug radially projecting inwardly into the central hole, with each the first tab of the screen being in contact, in an orthoradial direction, with the at least one lug of the pack of laminations, and
   a stator support, the stator being mounted on the stator support.

7. A method for manufacturing a stator assembly for an electronically switched electric motor, the stator assembly including:
   a stator extending in the direction of a first axis, the stator including a winding support, around which at least one winding is wound, the winding support having a radially inner surface defining a central hole extending in the direction of the first axis;
   a screen at least partly covering the at least one winding of the stator, the screen including a first tab in contact with the radially inner surface of the winding support,
   wherein the winding support includes a pack of laminations at least partly covered by an insulator, with the first tab being in contact with part of a radially inner surface defined by the pack of laminations,
   wherein the pack of laminations includes at least one lug radially projecting inwardly into the central hole, with each the first tab of the screen being in contact, in an orthoradial direction, with the at least one lug of the pack of laminations,
   the method comprising:
      providing the stator;
      providing the screen including the first tab extending in a direction having at least one component in a radial direction relative to the first axis;
      positioning the screen opposite the stator in the direction of the first axis, such that the screen at least partly covers the at least one winding of the stator, the first tab of the screen extending, in the vicinity of the central hole of the winding support, radially inwardly relative to the first axis; and deforming the first tab, in order to be in contact with the radially inner surface of the winding support.

8. The manufacturing method as claimed in claim 7, wherein deforming the first tab involves deforming the first tab by applying a stress oriented in the direction of the first axis.

9. The manufacturing method as claimed in claim 7, wherein the winding support includes a pack of laminations at least partly covered by an insulator, wherein, when positioning the screen opposite the stator, the screen is positioned angularly relative to the stator such that the first tab partly extends opposite the at least one lug of the associated pack of laminations, in the direction of the first axis, with the first one tab projecting in an orthoradial direction, relative to the associated at least one lug.

* * * * *